(No Model.)

C. E. WRIGHT.
BAND SAW GUIDE.

No. 496,178. Patented Apr. 25, 1893.

WITNESSES
H. A. Lamb
Pearl M. Reynolds

INVENTOR
Charles E. Wright
By A. M. Wooster
Atty.

UNITED STATES PATENT OFFICE.

CHARLES ERSKINE WRIGHT, OF WATERBURY, CONNECTICUT.

BAND-SAW GUIDE.

SPECIFICATION forming part of Letters Patent No. 496,178, dated April 25, 1893.

Application filed September 8, 1892. Serial No. 445,345. (No model.)

*To all whom it may concern:*

Be it known that I, CHARLES ERSKINE WRIGHT, a citizen of the United States, residing at Waterbury, in the county of New Haven and State of Connecticut, have invented certain new and useful Improvements in Band-Saw Guides; and I do hereby declare the following to be a full, clear, and exact description of the invention, such as will enable others skilled in the art to which it appertains to make and use the same.

My invention relates to the class of band saw guides in which the back of the saw bears against the face of a disk, the latter being rotated by the contact of the saw.

I have improved the general construction and operation of the guide by providing an easily adjusted side guide which may be rigidly locked in position after adjustment so as to render it impossible for the side guide to become loose through the motion of the saw or through the jar of machinery.

Figure 1:
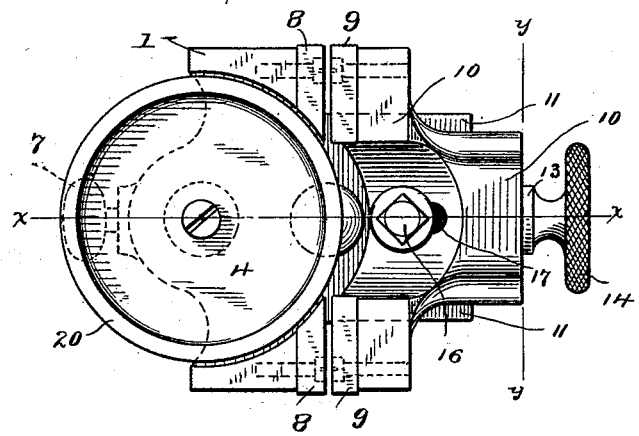
Figure 2:
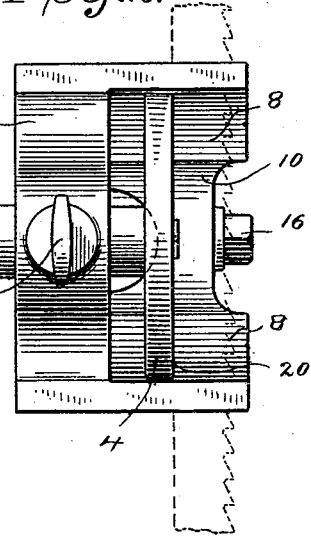
Figure 3:
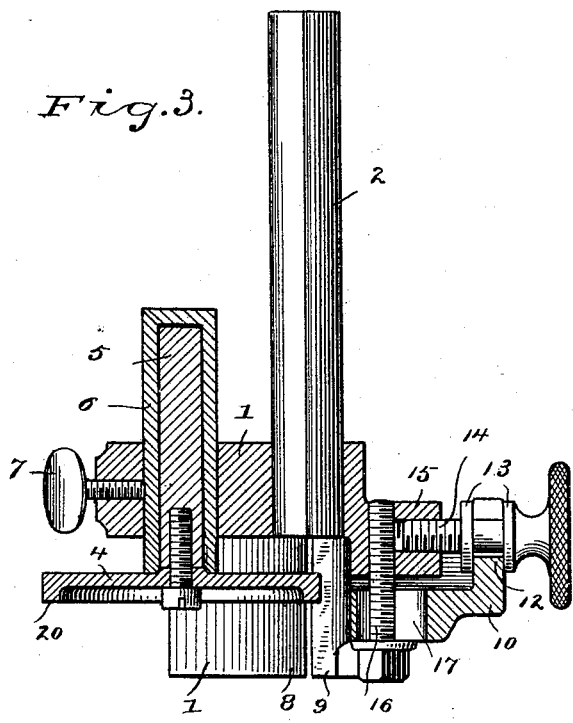
Figure 4:
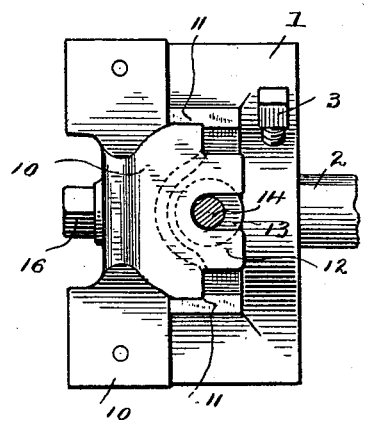

With these ends in view I have devised the novel construction which I will now describe referring by numbers to the accompanying drawings forming part of this specification in which:

Figure 1 is a front elevation of my novel guide complete. Fig. 2 is a side elevation thereof showing the manner in which the disk is adjusted to different widths of saws; Fig. 3 a section on the line $x\,x$ in Fig. 1, and Fig. 4 is a section on the line $y\,y$ in Fig. 1 looking toward the left.

1 denotes the body of the guide, 2 the arm by which it is supported and 3 a set screw by which the body is locked to the arm.

4 denotes the disk, 5 the spindle by which it is carried, 6 the socket which receives the spindle and 7 the set screw by which the socket carrying the disk is locked in any required position, the exact position depending of course upon the width of saw that is being used. The disk is provided on its outer face at its periphery with a circular flange 20 against which the back of the saw bears in use. This flange forms the sole bearing for the back of the saw in use and all the wear that takes place affects the flange evenly so that no shoulder is formed for the side of the saw to bear against. It will be seen from Fig. 3 that the disk is very much thicker at the flange than at the central portion, the flange is in fact made thick enough so that the disks will last for an almost unlimited length of time.

8 denotes the inner guide plates which are preferably made of chilled steel and which are rigidly secured to the body.

9 denotes the outer guide plates which are rigidly secured to a slide 10 adapted to move in ways 11 in the body. The outer end of the slide is provided with a yoke 12 which is engaged on opposite sides by collars 13 on an adjusting screw 14 which engages a hub 15 formed on the body. The slide is locked in position after adjustment by means of a bolt 16 which passes through a slot 17 in the slide and engages the hub at right angles to the adjusting screw, see Fig. 3.

Having thus described my invention, I claim—

The combination with the body, the supporting arm therefor, the inner guide plates, and the disk located in the recess formed by said guide plates, of ways 11 extending laterally from the body and outer guide plates having a like lateral extension or slide 10 fitting the ways, a locking bolt connecting the two and an adjusting screw carried by the slide or extension 10, the said outer guide plates with their supporting and adjusting means being located to one side of the supporting arm, substantially as described.

In testimony whereof I affix my signature in presence of two witnesses.

CHARLES ERSKINE WRIGHT.

Witnesses:
    MARY DWYER,
    JOHN W. WEBSTER.